United States Patent
Nemoto et al.

[19]

[11] Patent Number: 6,154,287
[45] Date of Patent: Nov. 28, 2000

[54] PRINTING DEVICE

[75] Inventors: Yoshihiko Nemoto; Masanori Satake, both of Ebina, Japan

[73] Assignee: Fuji Xerox Co., Ltd., Tokyo, Japan

[21] Appl. No.: 08/955,319

[22] Filed: Oct. 21, 1997

[30] Foreign Application Priority Data

Oct. 24, 1996 [JP] Japan .................................. 8-282659

[51] Int. Cl.[7] .................................................. G06F 15/00
[52] U.S. Cl. ......................... 358/1.15; 358/1.1; 358/1.6; 358/1.18
[58] Field of Search .................................. 395/101, 106, 395/112, 114, 117, 200.2, 200.38, 285, 865; 358/1.1, 1.6, 1.11, 1.12, 1.13, 1.14, 1.15, 1.18

[56] References Cited

U.S. PATENT DOCUMENTS

| | | | |
|---|---|---|---|
| 5,303,336 | 4/1994 | Kageyama et al. | 395/114 |
| 5,633,992 | 5/1997 | Gyllenskog | 395/114 |
| 5,748,915 | 5/1998 | Iijima | 395/285 |
| 5,857,073 | 1/1999 | Tsukamoto et al. | 395/200.38 |
| 5,870,533 | 2/1999 | Takagi | 395/114 |

FOREIGN PATENT DOCUMENTS

| | | |
|---|---|---|
| 4-328934 | 11/1992 | Japan . |
| 5-150914 | 6/1993 | Japan . |
| 5-313836 | 11/1993 | Japan . |
| 7-148991 | 6/1995 | Japan . |

*Primary Examiner*—Edward L. Coles
*Assistant Examiner*—Mark Wallerson
*Attorney, Agent, or Firm*—Oliff & Berridge, PLC

[57] ABSTRACT

A printing device that comprises a receiver for receiving print data from a host computer, a transmitter for transmitting to the host computer a reception process completion signal indicating that the receiver completes the receiving of print data, a recognizing device for recognizing that the host computer requests the receiver and transmitter to change a communication protocol to another, and an altering device for altering the timing of transmitting a reception process completion signal sent by the transmitter when the recognizer recognizes the change of the communication protocol to another.

17 Claims, 7 Drawing Sheets

PRINTING DEVICE

BACKGROUND OF THE INVENTION

The present invention relates to a printing device to be connected to a host computer, such as a personal computer.

Generally, the printing device receives print data every data unit from a host computer, e.g., a personal computer, and renders a reception process completion signal active every time it receives the unit data and waits for the next data delivered from the host computer. The host computer, which sends print data every data unit to the printing device, does not send the next data till the reception process completion signal becomes active. In other words, the host computer sends print data to the printing device every time a reception process completion signal received from the printing device becomes active.

Recent printing devices are operable at high speed. Accordingly, if the printing device quickens the timing of making the reception process completion signal active in accordance with the data transferring ability of the host computer, the host computer successively sends print data at a data transfer rate, which depends on its data transfer ability. In other words, if the host computer is able to transfer data at a high transfer rate, it is allowed that the printing device renders the reception process completion signal active at instant that the printing device completes the reception of the print data. On the other hand, if the host computer is unable to transfer data at a high transfer rate, the printing device waits for a time, which depends on the data transfer ability of the host computer, after it completes the reception of print data, and then renders the reception process completion signal active. For this reason, the printing device switches by necessity the timing of rendering the reception process completion signal active (width of the reception process completion signal) to another timing in accordance with the data transfer ability of the host computer. The Unexamined Japanese Patent Application Publication No. Hei. 5-313836 (prior device 1) discloses a printing device capable of transferring data in harmony with the data transferring ability of the host computer connected thereto in a manner that the time width of the reception process completion signal is set to a desired value of width in a parallel interface circuit for receiving print data from the host computer.

The Unexamined Japanese Patent Application Publication No. Hei. 7-148991 (prior device 2) discloses a printing device capable of transferring data in harmony with the data transferring ability of the host computer connected thereto in a manner that the time width of the reception process completion signal is switched to a desired value of width in a parallel interface circuit for receiving print data from the host computer.

The Unexamined Japanese Patent Application Publication No. Hei. 5-150914 (prior device 3) discloses a printing device arranged such that a plural number of parallel interface circuits for receiving print data from the host computer are provided, time width information of a reception process completion signal is stored for each parallel interface circuit, and the printing device carries out a data transfer which depends on the time information of the parallel interface s elected .

The Unexamined Japanese Patent Application Publication No. Hei. 4-328934 (prior device 4) discloses a printing device arranged such that when an emulation mode is switched, communication conditions are automatically set to proper ones in the parallel interface circuit for receiving print data form the host computer.

Each of the conventional devices (prior devices 1 to 3) can transfer data at a transfer rate, which depends on the data transferring ability of the host computer by switching or setting the time width of the reception process completion signal. The setting or switching of the time width of the reception process completion signal necessitates manual operations by a user through the keyboard or the host computer connected to the printing device, however. Further, the knowledge and information on the host computer are indispensable for the checking as to if the data transfer between the host computer and the printing device is proper after the time width of the reception process completion signal is altered.

In the prior device 4, when the emulation mode is switched and the communication conditions are altered, the printing device analyzes receiving data to automatically switch the emulation mode to a proper one. No intervention by the user is required for this operation. In the device design, no consideration given on the checking as to if the data transfer between the host computer and the printing device is proper after the time width of the reception process completion signal is altered. Because of this, the knowledge and information on the host computer are indispensable for the setting of communication conditions. Further, in the case of the printing device which is designed lacking the automatic switching function of the emulation mode, the user's intervention is essential to the altering of the communication conditions.

The prior devices suffer from an additional disadvantage. Information storing means is indispensable for the retaining of the time width information of the reception process completion signal every the altering of the communication conditions. To this end, information storing means is provided in the parallel interface or an independent storing means is provided. This problem is more serious in particular in the printing device having a number of parallel interfaces since its circuit scale is large.

Thus, the high data transfer ability of the host computer is uncertain. Because of this, the time width of the reception process completion signal of the printing device is generally selected so as to be compatible with such a host computer that cannot transfer data at a high data transfer rate. This necessitates the user's intervention for high speed data transmission. Also when the printing device is connected to the host computer that can transfer data at a high data transfer rate, an intervention by the user who has the knowledge and information on the host computer is required for the communication condition setting. Further, every time the host computer is changed to another, it is necessary to check as to if the high speed data transmission is required.

SUMMARY OF THE INVENTION

The present invention has been made in view of the above circumstances and has an object to provide a printing device which simplifies the operation by the user, requires no increase of the circuit scale, is capable of judging the data transferring ability of the host computer connected thereto, and able to transfer data at a high transfer rate, which depends on the data transferring ability of the host computer connected thereto.

To achieve the above object, there is provided a printing device comprises: receiving means for receiving print data from a host computer; transmitting means for transmitting to the host computer a reception process completion signal indicating that the receiving means completes the receiving of print data; recognition means for recognizing that the host computer requests the receiving means and transmitting means to change a communication protocol to another; and altering means for altering the timing of transmitting a reception process completion signal sent by the transmitting means when the recognition means recognizes the change of the communication protocol to another.

In the printing device thus constructed, when the host computer changes a communication protocol by the receiving means and transmitting means, the recognition means recognizes the protocol change. When the recognition means recognizes the protocol change, the altering means alters a transmission timing of a reception process completion signal sent by the transmitting means. The data transfer from the host computer to the printing device is performed in a manner that the printing device receives print data from the host computer, and upon completion of the print data reception, the transmitting means sends a reception process completion signal to the host computer at the transmission timing altered by the altering means, and request the host computer to send the next print data. Thus, when the host computer changes the communication protocol, viz., it is able to transfer data at a high speed transmission, the transmission timing of the reception process completion signal is automatically altered. Therefore, the operation work by the user is simplified, no increase of the circuit scale is required. The printing device can recognize the data transfer ability of the host computer, can perform a high speed data transmission in harmony with the data transmission ability of the host computer.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

DESCRIPTION OF THE PREFERRED EMBODIMENT

Figure 1:
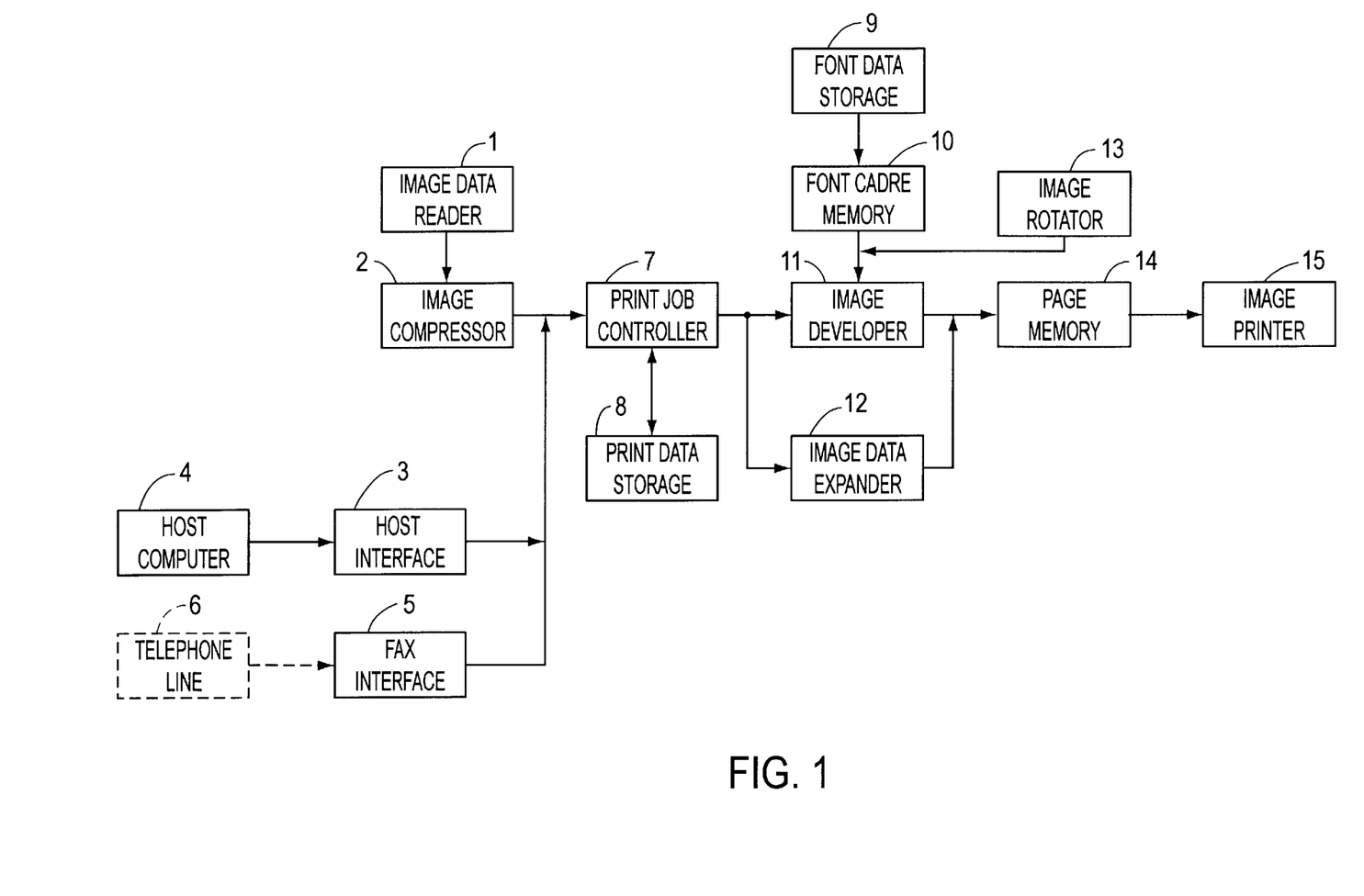
FIG. 1 is a block diagram showing an arrangement of a printing device which is an embodiment of the present invention.

The preferred embodiment of the present invention will be described with reference to the accompanying drawings.
Construction Description
A-1) Arrangement of a Printing Device
FIG. 1 is a block diagram showing an arrangement of a printing device which is an embodiment of the present invention. In the figure, an image data reader means 1 reads image data on a printing medium, e.g., printing paper or OHP, and supplies readout image data as print data to an image compressing means 2. The image compressing means 2 analyzes the image data received from the image data reader means 1 and compresses it according to a given data compressing algorithm. A host interface 3 receives print data directly from a host computer 4 connected thereto or by way of a network from a host computer. A facsimile interface 5 receives print data from an external device, e.g., a facsimile machine, which is connected thereto via a public line 6.

A print job control means 7 receives print data from any of the image compressing means 2, host interface 3 and host computer 4 and stores it in a print data storage means 8, and the same controls a print processing order of each print job. The print job control means 7 receives print data from any of the image compressing means 2, host interface 3 and host computer 4, and stores it every job unit, which results from the data dividing carried out by the print job control means 7.

A font data storage means 9 stores outline font data used for generating the image data on the basis of the print data, and develops the resultant data on a page memory. A font cache memory means 10 stores bit map data generated on the basis of the outline font data. An image developing means 11 interprets as code data to generate image data in order to generate image data on a page memory 14. An image data expanding means 12 expands the compressed data to produce image data in order to generate image data on the page memory means 14.

Figure 2:
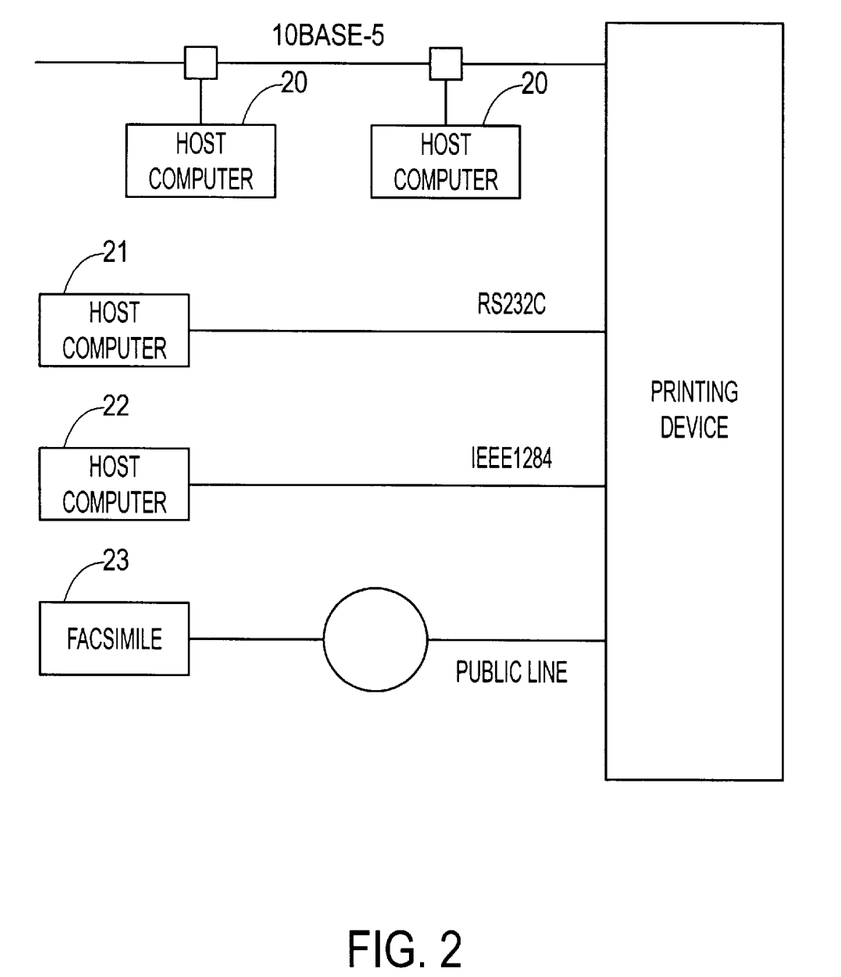
FIG. 2 is a block diagram showing an electrical connection in an image compressing means and a facsimile interface in the printing device of FIG. 1.
Figure 3:
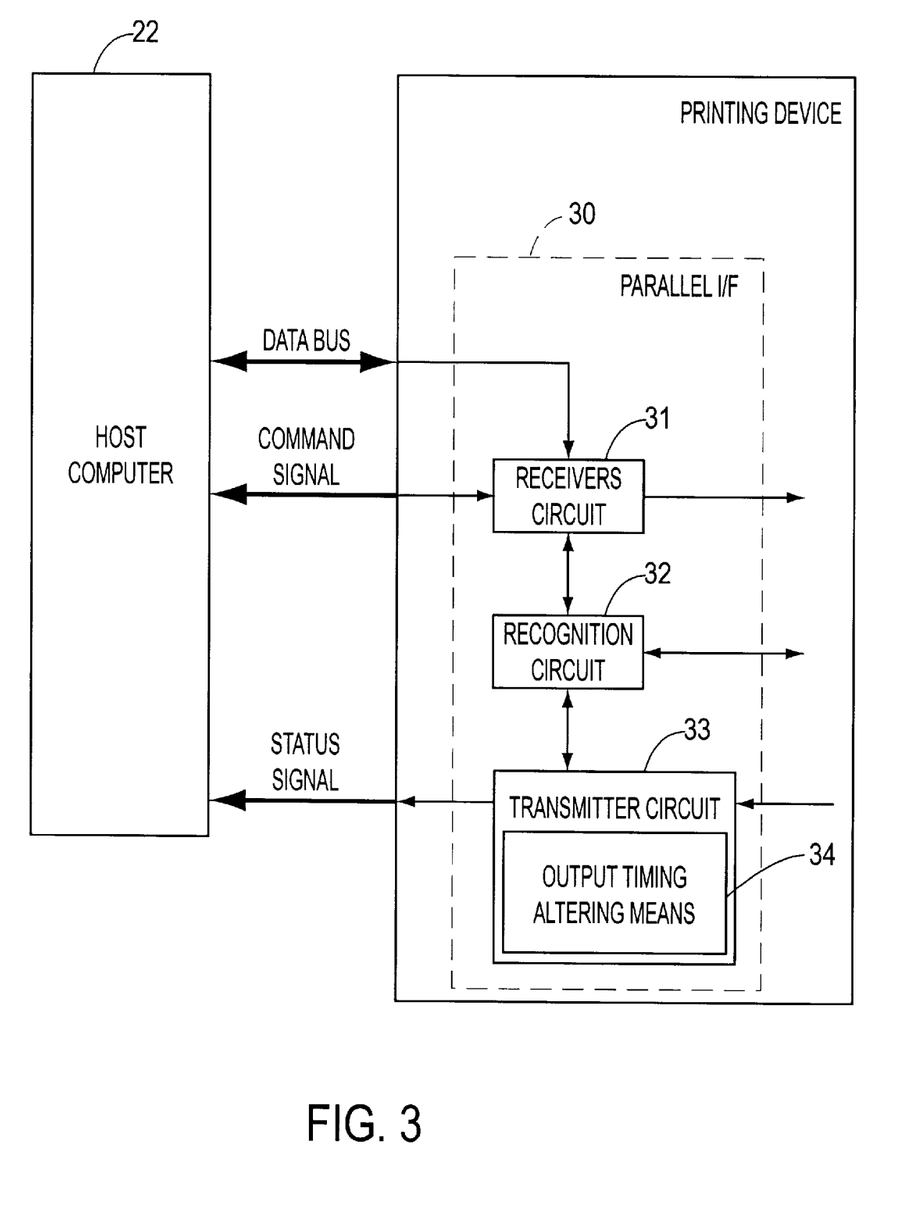
FIG. 3 is a block diagram showing the IEEE1284 parallel interface in the host computer.

An image rotation means 13 turns, at a desired angle, the bit map data of the font cache memory 10 or the whole image data of the page memory 14. The page memory 14 stores the image data that is generated by the image developing means 11 or the image data expanding means 12, and printed out by an image printing means 15. The image printing means 15 prints the image data, which is read out of the page memory 14, in the pictorial form on a printing medium, e.g., a printing paper.
A-2) Interface arrangement FIG. 2 is a block diagram showing an electrical connection in the image compressing means and the facsimile interface in the printing device of FIG. 1. As shown, the printing device includes the following interface means for connection to external devices or machines: 1) Ethernet for a network connection to a plural number of host computers 20; 2) RS232C interface for a serial connection to a host computer 21, and 3) IEEE1284 parallel interface for a parallel connection a host computer 22, a mode for connection to external machines, e.g., facsimile machines 23, and 4) others.
A-3) Parallel Interface FIG. 3 is a block diagram showing the IEEE1284 parallel interface in the host computer. In the figure, a parallel I/F 30 includes a receiver circuit 31, recognition circuit 32, and transmitter circuit 33. The receiver circuit 31 receives data from the host computer 22 by way of a data bus in the parallel I/F 30, in response to a command signal issued from the host computer 22. The recognition circuit 32 controls a communication protocol in accordance with a command signal and a data signal, which are output from the host computer 22.

The recognition circuit 32 outputs a status signal (Busy signal, nAck signal) representative of a status of the printing device for transmission to the host computer 22 in accordance with information on the communication protocol from the recognition circuit 32. It is noted that in the present embodiment, the transmitter circuit 33 includes an output timing altering means 34 to be given later. In accordance with information of the communication protocol from the recognition circuit 32, the transmitter circuit 33 alters a timing to render a reception process complete signal (nAck signal) active (low in level) or changes the pulse width of a low level signal, to thereby control a time up to the arrival of the next print data from the host computer 22. The nAck signal indicates that the printing device completes a reception process and is ready for the next print data reception, and is transmitted to the host computer 22.

A-4) Reception Process Completion Signal

Figure 4:
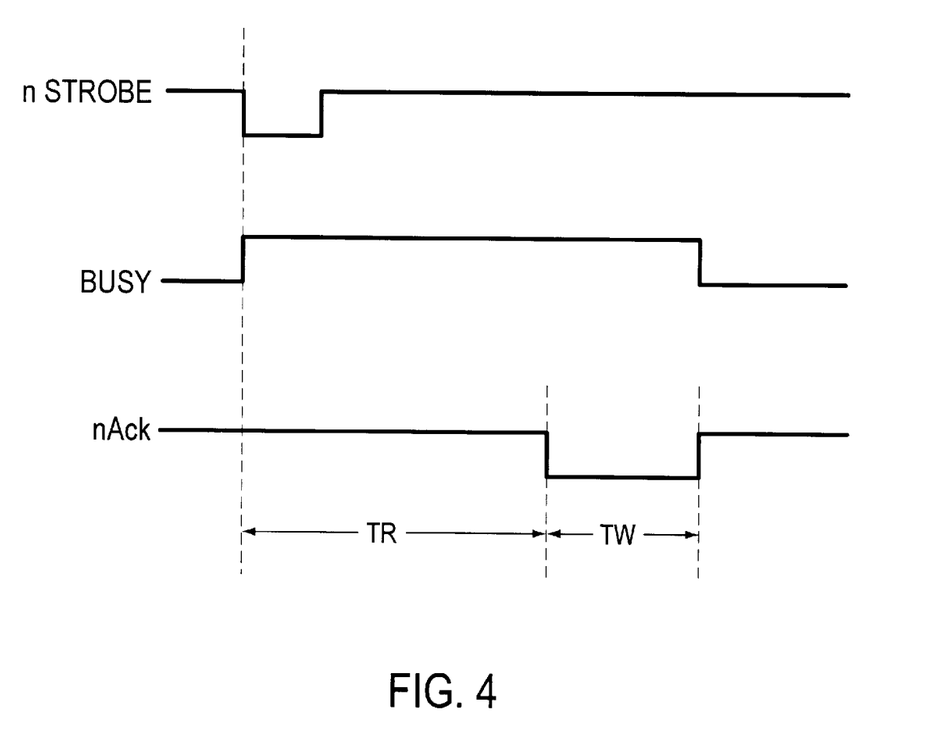
FIG. 4 is a diagram useful in explaining a reception process completion signal used for the data transfer between the host computer and the printing device.

FIG. 4 is a diagram useful in explaining a reception process completion signal used for the data transfer between the host computer 22 and the printing device when the IEE1284 parallel interface is selected in the parallel I/F 30. In the figure, an nStrobe signal is a command signal issued from the host computer 22, and indicates that valid data is present on the data bus. A Busy signal is a status signal output from the printing device, and indicates that the printing device rejects the reception of the data transmitted from the printing device. An nAck signal is a status signal output from the printing device, and indicates that the printing device completes the process of the received data and is ready for the next data reception. In an initial state, from transfer data to the host computer 22 which is unable to transfer data at high speed, the nStrobe signal goes low and the printing device receives data, and after its response time TR, it produces an nAck signal (reception process completion signal), which is at a low level and has a pulse width TW.

A-5) Output Timing Altering Means for the nAck signal

Figure 5:
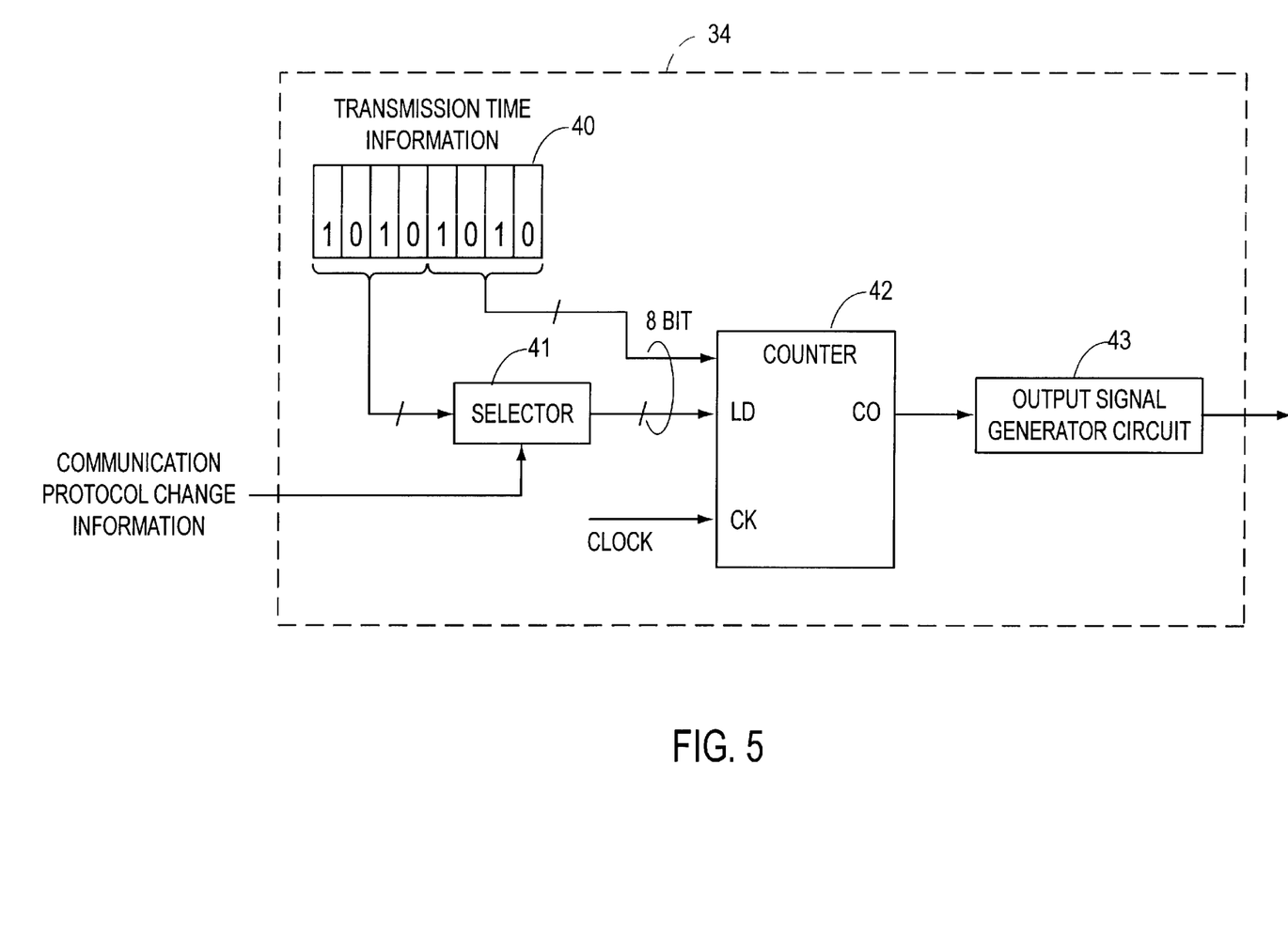
FIG. 5 is a block diagram showing an output timing altering means for altering the outputting timing of the nAck signal in the present embodiment.

FIG. 5 is a block diagram showing an output timing altering means 34 for altering the outputting timing of the nAck signal in the present embodiment. The output timing altering means 34 is contained in the transmitter circuit 33 of the parallel I/F 30. In the figure, the output timing altering means 34 is made up of a register 40, selector 41, counter 42, and output signal generator circuit 43. The register 40 contains transmission time information of 8 bits. The transmission time information is used as data for controlling the response time TR and the pulse width TW of the nAck signal. The 4 low-order bits of the transmission time information are supplied to the counter 42, while the 4 high-order bits are supplied to the selector 41.

In the initial state, the selector 41 supplies the 4 high-order bits of the transmission time information to the counter 42. When receiving communication protocol changing information, which is indicative of a change of the communication protocol that the upper machine uses for the data transfer to and from the printing device, the selector 41 stops the supplying of the 4 high-order bits of the transmission time information to the counter 42. Therefore, in a normal state, the transmission time information of 8 bits, stored in the register 40, is transmitted, as it is, to the counter 42. In a state that the protocol that the host computer 22 uses for the data transfer to and from the printing device is changed, the transmission time information of a total of 8 bits is supplied to the counter 42 in a state that the 4 high-order bits of the transmission time information are "0000" and the 4 low-order bits remain unchanged.

To control the pulse width TW, for example, the counter 42 starts to count a clock signal CK supplied from exterior at the trailing edge of the nAck signal. When the data value supplied as the transmission time information is reached, the counter 42 renders the output CO active (e.g., logical "1" state). To control the response time TR, the counter 42 starts to count the clock signal CK at the leading edge of the Busy signal. When the data value supplied as the transmission time information is reached, the counter 42 renders the output CO active (e.g., logical "1" state).

When the output of the counter 42 is rendered active, an nAck signal of the pulse width TW (or response time TR) is set at a low level (high level). Specifically, when the data of 8 bits that is stored as the transmission time information in the register 40 is supplied to the counter 42, the counter 42 counts till its count reaches 8 bits. When the transmission time information is "0000"+4 low-order bits, the counter 42 counts till its count reaches "0000"+4 low-order bits. Therefore, when a case where the transmission time information of "0000"+4 low-order bits is supplied to the counter 42 is compared with a case where the normal transmission time information of 8 bits is supplied to the same, the former case sets the output of the counter 42 at a high level for a shorter time than the latter case. Therefore, the printing device quickly sends a next-data transfer request to the host computer 22. The result is to realize a high speed data transmission.

In the present embodiment, a couple of the above-mentioned arrangements are provided for the controls of the response time TR and the pulse width TW. If required, a single above-mentioned arrangement may be used. In this case, the TR or TW control is selected in accordance with the contents of the register 40. Thus, the embodiment of the invention is arranged such that the transmission time information is used commonly for the initial state and the high data transfer state. Because of this, the embodiment can alter the transmission timing of the reception process completion signal, with a simple circuit construction.

B. Operation Description

Figure 6:
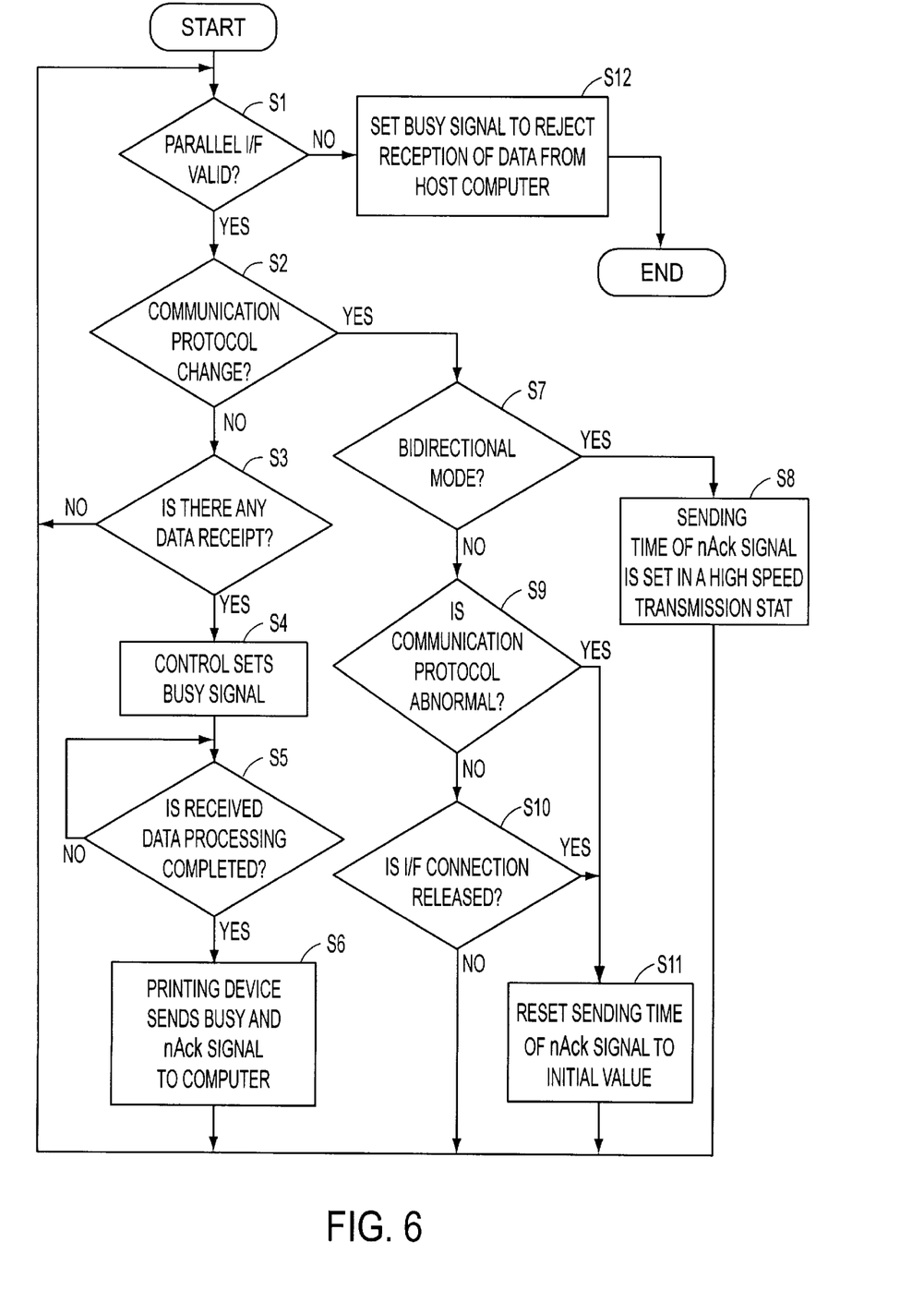
FIG. 6 is a flow chart useful in explaining the altering of the outputting timing of the reception process completion signal in the printing device.

An operation of the thus arranged printing device will be described. FIG. 6 is a flow chart useful in explaining the altering of the outputting timing of the reception process completion signal. A step S1 judges whether or not the parallel I/F 30 is valid, If it is invalid, a step S12 sets a Busy signal to reject the reception of the data from the host computer 22. If the parallel I/F 30 is valid, the printing device is rendered ready for reception of data from the host computer 22. When data is received from the host computer 22, the control by the printing device advances to a step S3 where it checks if there is data received, and if so, advances to the next step S4. In this step, the control sets the Busy signal, and waits till the received data processing is completed, in a step S5. When the received data processing is completed, the control advances to a step S6. In this step, the printing device sends a Busy signal and an nAck signal to inform the host computer 22 of the completion of the received data processing, and returns to the step S1 where it is put to a data reception waiting mode.

Figure 7:
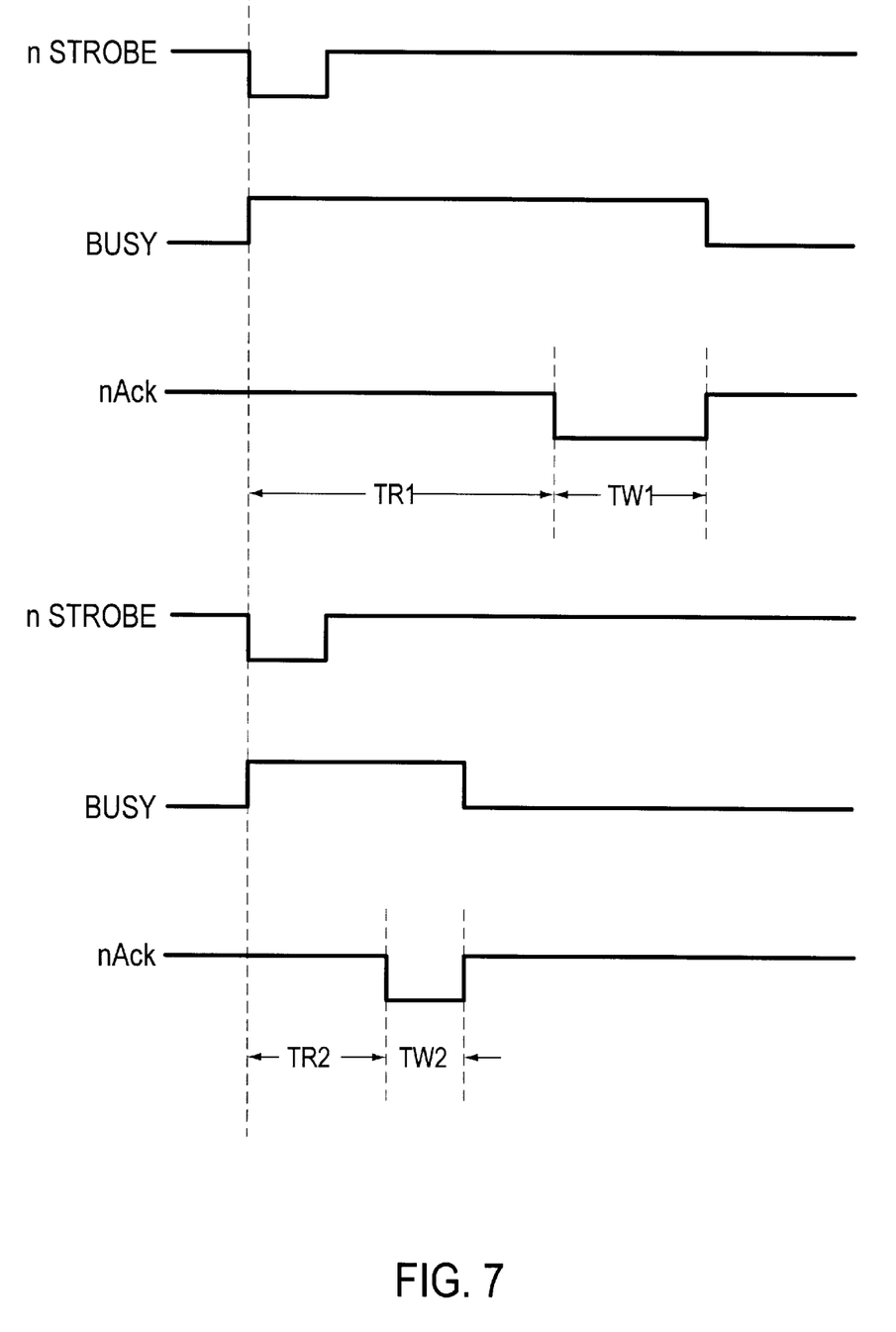
FIG. 7 is a diagram useful in explaining a difference between a reception process completion signal in an initial state and that after the transmission time is altered.

In this case, in the printing device, the communication protocol changing information is applied to the selector 41, so that the output signal of the selector 41 is applied to the register 40. The output signal becomes the 4 high-order bits in the register 40 (FIG. 5). Thereafter, the printing device is placed in a compatibility mode as an initial state mode defined by the IEEE1284, and receives print data from the host computer 22 through the steps S3 to S6. In this case, the nAck signal has a normal response time TR1 and a normal pulse width TW1 as shown in FIG. 7. The data is transferred at a normal data transfer rate.

If, in the process of the steps S1 to S6, the printing device detects a communication protocol change upon a request from the host computer 22, the control by the printing device jumps from the step S2 to a step S7. In the step S7, the control checks if the current communication mode is a bidirectional mode, viz., there is a protocol change request to change the communication protocol to a mode in which data may be transferred from the printing device to the host computer, e.g., a nibble mode described in IEEE1283, byte mode, or ECP mode.

If it is a protocol change request to change the current communication protocol to a communication protocol which allows data to be transferred from the printing device to the host computer 22, the host computer 22 is compatible with the IEEE1284 protocol. In this case, it can be judged that the host computer is able to transfer data at a high data transfer rate. Therefore, the control advances to a step S8 where it sets the sending time of the nAck signal for high data rate transmission. Specifically, the output data of the selector 41 is set at "0000", and "0000"+"1010" (4 low-order bits of the register 40) are sent to the counter 42 (FIG. 5). Thereafter, the printing device returns to a normal compatibility mode through a termination phase, and receives print data from the host computer 22. Accordingly, in this case, the response time TR2 and the pulse width TW2 of the nAck signal are shorter than those TR1 and TW1 of the normal nAck signal, and high data rate transmission is performed.

The host computer 22 produces a communication protocol change request in the following situations: 1) The power switch of the host computer 22 is turned on in order that the host computer 22 acquires the information on the printing device, 2) The host computer 22 detects its connection to the printing device, 3) The host computer 22 alters the settings on the printing device, for example, the host computer changes the print drive, 4) The host computer 22 fetches the image data stored in the printing device, and 5) Others.

When the printing device detects a communication protocol change request issued from the host computer 22, and it is not a mode described in the conventions of IEEE1284 protocol or not a phase change request, the control of the printing device proceeds to a step S9. In this step, the control judges whether or not the communication protocol is abnormal. Examples of the abnormal operations of the communication protocol are: 1) The host computer 22 is abnormal in operation, 2) No response from the host computer 22 is returned within a preset time, 3) There is a possibility that the host computer 22 to which the printing device is coupled is changed to another, for example, a cable connecting the host computer 22 to the printing device is removed. In this case, the sending time of the nack signal is reset to an initial value in a step S11.

In this case, in the printing device, the communication protocol change information causes the selector 41 to output the 4 high-order bits of the register 40 to the counter 42. As a result, "10101010" is transferred to the counter 42 (FIG. 5). Thereafter, the printing device returns to a normal compatibility mode, and receives print data from the host computer 22 through the process of steps S3 to S6. Accordingly, in this case, as shown in FIG. 7, the nAck signal has a normal response time TR1 and a normal pulse width TW1. As a result, the data transfer is carried out at a normal data transfer rate. Thus, when the protocol being abnormal is detected, the data transfer rate is reduced to a conventional (low) data transfer rate, whereby a normal data transfer is carried out between the host computer 22 and the printing device.

When the communication protocol is normal, the control checks if the printing device is disconnected from the host computer 22. Also when the printing device is disconnected from the host computer, the control resets the sending time of the nAck signal to an initial value in step S11. Therefore, also in this case, in the printing device, the communication protocol change information causes the selector 41 to output the 4 high-order bits of the register 40 to the counter 42. As a result, "10101010" is transferred to the counter 42 (FIG. 5). Thereafter, the printing device returns to a normal compatibility mode, and receives print data from the host computer 22 through the process of steps S3 to S6.

Accordingly, also in this case, as shown in FIG. 7, the nAck signal has a normal response time TR1 and a normal pulse width TW1. As a result, the data transfer is carried out at a normal data transfer rate. The reason for this follows. Also when the printing device is disconnected from the host computer 22, the host computer may be changed to another, for example, when the power switch of the host computer is turned off, and when the power switch of the printing device is turned off. Therefore, when the protocol being abnormal is detected, the data transfer rate is reduced to a conventional (low) data transfer rate, to thereby enable a normal data transfer to and from the host computer 22 and the printing device.

As seen from the foregoing description, the recognizing means recognizes the change of a communication protocol by the receiving means and the transmitting means. When the recognizing means recognizes the change of a communication protocol, the altering means alters the transmission timing of a reception process completion signal sent by the transmitting means. The receiving means receives print data from the host computer. Upon completion of the data reception, the transmitting means sends a reception process completion signal to the host computer at the transmission timing altered by the altering means, and requests the host computer to send the next data. In this way, data is transferred from the host computer to the printing device. When the host computer changes the communication protocol to another, viz., it is able to transfer data at a high data transfer rate, the transmission timing of the reception process completion signal is automatically altered. Therefore, the following useful effects are obtained.

1) The use who has less knowledge on the printing device and the host computer can operate the printing device.
2) The setting and altering work on the keyboard, for example, by the user is not required.
3) It never happens that the user mistakenly connects the printing device to the host computer which is incompatible with the printing device.
4) The interface is efficiently used since the printing device performs the data transfer in harmony with the data transfer ability of the host computer.
5) When the host computer to be connected to the printing device is changed to another, there is no need of resetting the printing device.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printing device comprising:
   receiving means for receiving print data from a host computer;

transmitting means for transmitting to said host computer a reception process completion signal indicating that said receiving means completes the receiving of print data;

recognition means for recognizing that said host computer requests said receiving means to change a communication protocol to another communication protocol;

selection means for selecting a subset of a given number of bits of a transmission time information to control at least one of a response time and a pulse width; and altering means for altering the timing of transmitting a reception process completion signal sent by said transmitting means in response to said recognition means recognizing the change of the communication protocol to another communication protocol;

the altering means comprising:

information retaining means for retaining transmission time information of a given number of bits for setting a transmitting timing of a reception process completion signal;

reference bit changing means for changing at least one reference bit for the transmission time information retained in said information retaining means to another at least one reference bit when said recognition means recognizes the change of a communication protocol to another communication protocol; and transmission timing determining means for determining a transmission timing of said reception process completion signal on the basis of said at least one reference bit changed by said reference bit changing means.

2. The printing device of claim 1, wherein when said host computer requests said printing device to change a first transfer mode for transferring data from said host computer to said printing device to a second transfer mode for transferring data from said printing device to said host computer, said recognition means recognizes this request as a request to change a communication protocol to another communication protocol.

3. The printing device of claim 1, wherein when the data transfer mode is changed from a first transfer mode for transferring data from said host computer to said printing device to a second transfer mode for transferring data from said printing device to said host computer, said recognition means recognizes this mode change as a request to change a communication protocol to another communication protocol.

4. The printing device of claim 1, further comprising: abnormality detecting means for detecting an abnormality of a communication protocol;

wherein when said abnormality detecting means detects an abnormality of a communication protocol, said recognition means recognizes the abnormal state of said communication protocol as the change of the communication protocol to another communication protocol, and when said recognition means recognizes the change of the communication protocol, said altering means resets the transmitting timing of a reception process completion signal sent by said transmitting means to an initial value.

5. A printing device comprising:

receiving means for receiving print data from a host computer;

transmitting means for transmitting to said host computer a reception process completion signal indicating that said receiving means completes the receiving of print data;

recognition means for recognizing that said host computer requests said receiving means to change a communication protocol to another communication protocol;

selection means for selecting a subset of a given number of bits of a transmission time information to control at least one of a response time and a pulse width; and altering means for altering the timing of transmitting a reception process completion signal sent by said transmitting means in response to said recognition means recognizing the change of the communication protocol to another communication protocol; and connection detecting means for detecting a connection state of said printing device to said host computer, wherein when said connection detecting means detects a disconnection state of said printing device from said host computer, said recognition means recognizes said disconnection state as the change of the communication protocol to another communication protocol, and when said recognition means recognizes the change of the communication protocol to another communication protocol, said altering means resets the transmitting timing of a reception process completion signal, sent by said transmitting means, to an initial value.

6. The printing device of claim 1, wherein when said recognition means does not recognize the change of the communication protocol to a high data transmission rate protocol, said reference bit changing means sets all the bits of said transmission time information to reference bits, and when said recognition means recognizes the change of the communication protocol to a high data transmission rate protocol, said reference bit changing means sets some of the bits of said transmission time information to reference bits.

7. The printing device of claim 6, wherein when said recognition means recognizes the change of the communication protocol to a high data transmission rate protocol, said reference bit changing means sets the low-order bits of the bits of said transmission time information to reference bits.

8. A printing device comprising:

receiving means for receiving print data from a host computer;

transmitting means for transmitting to said host computer a reception process completion signal indicating that said receiving means completes the receiving of print data;

recognition means for recognizing that said host computer requests said receiving means to change a communication protocol to another communication protocol;

selection means for selecting a subset of a given number of bits of a transmission time information to control at least one of a response time and a pulse width;

altering means for altering the timing of transmitting a reception process completion signal sent by said transmitting means in response to said recognition means recognizing the change of the communication protocol to another communication protocol;

data retaining means for retaining transmission time data for setting a transmitting timing of a reception process completion signal;

data altering means for altering the transmission time data retained in said data retaining means when said recognition means recognizes the change of the communication protocol to another communication protocol;

counting means for counting a clock signal until the count of said counting means reaches the transmission time data retained in said data retaining means; and transmission instructing means for instructing said transmitting means to transmit a reception process completion signal when the count of said counting means reaches the transmission time data retained in said data retaining means.

9. The printing device of claim 8, wherein when said recognition means recognizes the change of the communication protocol to a high data transmission rate protocol, said data altering means sets the transmission time data to be smaller than the transmission time data set when said recognition means does not recognize the change of the communication protocol to a high data transmission rate protocol.

10. A method of printing data, comprising:

receiving print data from a host computer;

transmitting a reception process completion signal to the host computer upon completion of the reception of print data;

recognizing a change of a communication protocol to another communication protocol;

selecting a subset of a given number of bits of a transmission time information to control at least one of a response time and a pulse width;

altering a timing of the transmission of the reception process completion signal in response to the change of communication protocol to another communication protocol;

retaining transmission time information of a given number of bits that set a transmission timing of a reception process completion signal;

changing at least one reference bit for the transmission time information to another at least one reference bit when a communication protocol change is recognized; and determining a transmission timing of the reception process completion signal on the basis of the changed at least one reference bit.

11. The method of printing data of claim 10 further comprising selecting a subset of a given number of bits to control at least one of a response time and a pulse width.

12. The method of printing data of claim 10, wherein the step of recognizing recognizes a communication protocol change request when the host computer requests a printing device to change a transfer mode to a bidirectional transfer mode.

13. The method of printing data of claim 10, further comprising detecting a connection state of the printing device to the host computer, wherein the step of recognizing recognizes a disconnection state as a communication protocol change.

14. A printing device comprising:

a receiver that receives print data from a host computer;

a transmitter that transmits a reception process completion signal to the host computer upon completion of the reception of the print data;

a detector that detects a change of a communication protocol to another communication protocol;

a selector that selects a subset of a given number of bits of a transmission time information to control at least one of a response time and a pulse width; and a timing modification device that modifies the timing of the transmission of the reception process completion signal in response to the change of the communication protocol to another communication protocol the timing modification device comprising;

a memory for retaining transmission time information of a given number of bits for setting a transmitting timing of a reception process completion signal;

a changer for changing at least one reference bit for the transmission time information retained in the memory to another at least one reference bit when the detector recognizes the change of a communication protocol to another communication protocol; and a determiner for determining a transmission timing of the reception process completion signal on the basis of the at least one reference bit changed by the changer.

15. The printing device of claim 14, further comprising a selector that selects a subset of a given number of bits to control at least one of a response time and a pulse width.

16. The printing device of claim 14, wherein the detector detects a communication protocol change request when the host computer requests a printing device to change a transfer mode to a bidirectional transfer mode.

17. The printing device of claim 14, further comprising a connection state detector that detects a connection state of the printing device to the host computer, wherein if the connection state detector detects a disconnection state the detector identifies the disconnection state as a communication protocol change.

* * * * *